(12) United States Patent
Girard et al.

(10) Patent No.: US 6,499,502 B1
(45) Date of Patent: Dec. 31, 2002

(54) METHOD AND DEVICE FOR FILLING A DISTRIBUTION LINE WITH CORROSIVE GAS

(75) Inventors: Jean-Marc Girard, Paris (FR); James McAndrew, Paris (FR); Eric Duchateau, Le Pont de Claix (FR); Bertrand Lefevre, Paris (FR)

(73) Assignee: L'Air Liquide, Societe Anonyme a Directoire et Counseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/584,725

(22) Filed: Jun. 1, 2000

(30) Foreign Application Priority Data

Jun. 8, 1999 (FR) .............................. 99 07191

(51) Int. Cl.⁷ .......................... B08B 5/00; B08B 9/032
(52) U.S. Cl. ................. 137/240; 73/29.01; 73/29.02; 134/94.1; 134/98.1; 134/99.1; 134/166 C; 134/171; 137/15.04; 137/597; 141/4; 141/66; 141/89
(58) Field of Search ................. 137/240, 884, 137/15.04, 15.05, 597; 134/166 C, 166 R, 94.1, 98.1, 99.1, 171; 141/4, 65, 66, 83, 85, 89; 73/1.02, 29.01, 29.02

(56) References Cited

U.S. PATENT DOCUMENTS

| | | | | |
|---|---|---|---|---|
| 3,110,173 A | * | 11/1963 | Bishop ....................... 73/29.02 |
| 4,535,620 A | * | 8/1985 | Cunningham ............... 73/29.01 |
| 4,621,518 A | * | 11/1986 | Gerdes ....................... 73/29.02 |
| 4,869,301 A | * | 9/1989 | Ohmi et al. .................... 141/85 |
| 5,137,047 A | * | 8/1992 | George ....................... 137/240 |
| 5,368,062 A | * | 11/1994 | Okumura et al. ............ 137/240 |
| 5,419,179 A | * | 5/1995 | Shaw ......................... 73/29.02 |
| 5,497,316 A | * | 3/1996 | Sierk et al. .................. 137/240 |
| 5,749,389 A | * | 5/1998 | Ritrosi et al. .................. 137/15 |
| 5,819,782 A | * | 10/1998 | Itafuji ......................... 137/240 |
| 5,975,112 A | * | 11/1999 | Ohmi et al. ................. 137/240 |
| 5,992,463 A | * | 11/1999 | Redemann et al. ......... 137/884 |
| 6,012,478 A | * | 1/2000 | Park ........................... 137/240 |

FOREIGN PATENT DOCUMENTS

| | | |
|---|---|---|
| DE | 38 35 936 A | 4/1990 |
| EP | 0 250 162 A | 12/1987 |
| EP | 0 814 298 A | 12/1997 |
| FR | 2 444 882 A | 7/1990 |

* cited by examiner

Primary Examiner—George L. Walton
(74) Attorney, Agent, or Firm—Burns, Doane, Swecker & Mathis, L.L.P.

(57) ABSTRACT

The subject of the present invention is a method and a device for filling a distribution line (20) with corrosive gas. The said method is a method for filling with gas, with passivation, a line (20) for distributing corrosive gas, which line is intended to distribute the said corrosive gas to a system (3) located immediately downstream of the said line (20); the said method comprising:

prior conditioning of the said line (20);

the actual filling of the said line (20) with the said corrosive gas known as an active gas.

Characteristically, the said actual filling with gas comprises:

at least one cycle of filling the said line (20) with active gas as far as immediately upstream of the system (3) and of removing the said active gas thus introduced into the said line (20); the said removal being performed without the said active gas passing through the said system (3);

followed by the final filling of the said line (20) with gas so as to make the said gas available to the said system (3).

17 Claims, 4 Drawing Sheets

METHOD AND DEVICE FOR FILLING A DISTRIBUTION LINE WITH CORROSIVE GAS

This application claims priority under 35 U.S.C. §§119 and/or 365 to 99 07191 filed in France on Jun. 8, 1999; the entire content of which is hereby incorporated by reference.

BACKGROUND OF THE INVENTION

1. Field of the Invention

The subject of the present invention is a method and a device for filling a distribution line with corrosive gas. The subject of this invention is more specifically a method and its associated device for filling with gas, with passivation, a line for distributing corrosive gas; the said line being intended to distribute the said corrosive gas to a system located immediately downstream of this line and the said corrosive gas being capable of passivating it.

2. Description of the Related Art

The technical problem of obtaining good passivation of such corrosive-gas distribution lines with a view to, on the one hand, obtaining effective protection against corrosion of the said lines and of the said system supplied with the said gases by the said lines and, on the other hand, distribution of ultra-pure corrosive gases, is known to those skilled in the art.

To date, no truly satisfactory solutions to the said technical problem have been proposed (in particular, there are still problems with corrosion in the line and in the downstream equipment); the operation of filling with gas conventionally being performed in the following successive steps:

a first step of conditioning the line: this first step comprises at least one purge and a leak test. It generally comprises successive sequences of purging using one and the same inert gas, one and the same mixture of inert gas or several gases or mixtures of inert gases so as:

to eliminate impurities, particularly water, adsorbed onto the interior wall of the line (the said water accelerating corrosion in the presence of corrosive gas);

to check the tightness and integrity of the said line using conventional methods known to those skilled in the art;

and possibly, to analytically monitor the integrity parameters of the said line, such as the hygrometry, the oxygen content, the number of particles carried by the purge gas and supplied by the said line (the said purging gas obviously being clean and "free" of water, oxygen and particles).

On completion of this conditioning of the said line, the inert gas (or mixture of inert gases) contained therein is or are removed (purged). The said inert gas (or mixture of inert gases) is or are generally pumped, to remove it, via the equipment located at the end of the line;

a second step of filling the said line with active gas: the line is filled with the active (corrosive) gas. The said gas is thus made available to the equipment.

The amount of active gas introduced into the said conditioned line for filling the said line with gas (for the "first fill" of the said line with the said active gas) is thereafter generally left in this line and then, when the said line enters service, delivered downstream into the equipment to supply the said equipment with active gas. This amount of active gas, although limited but not in any way negligible, and in any event proportional to the length and square of the diameter of the line concerned, may be referred to as the priming, start-up, or "going live" quantity.

The Applicant should be given due merit for having clearly established, in a way which was not obvious, that this amount of active gas used for filling the line with active gas, and more generally the initial quantities of active gas delivered, were liable to generate the corrosion problems mentioned hereinabove and that this was true regardless of the rigour with which the prior conditioning of the said line was performed. Specifically, the Applicant has clearly established (see FIG. 2 appended to this description) that the corrosive gas, in generating the passivation layer from the surface layer of oxides in the said line during its "first passes" down the line, also generates water, the said water making the said gas more corrosive and being liable, on the one hand, to detract from the formation of the said passivation layer and, on the other hand, to adversely affect the said passivation layer formed. Thus, regardless of the rigour of the prior conditioning, with reference to the hygrometry parameter, there is always the in situ generation of water after the said conditioning. For example, on the interior walls of a steel or iron pipe there is inevitably contact between gaseous HCl (corrosive gas) giving rise to the following chemical reaction:

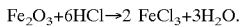

$$Fe_2O_3 + 6HCl \rightarrow 2\ FeCl_3 + 3H_2O.$$

Reactions of this type, known per se, were never alluded to within the particular context of the filling of distribution lines with corrosive gases. It is to the Applicant's credit that the link has been established.

In the context of the present invention, the Applicant therefore recommends limiting the harmful effects of the water generated in situ during the formation of the passivation layer as far as possible. To this end, it recommends an original and particularly effective (from the point of view of the desired passivation and the corrosion caused) method for filling a distribution line with corrosive gas; the said line being intended to distribute the said corrosive gas to a system (generally an item of equipment) located immediately downstream of the said line. The components of the said system will be all the more reliable (in other words, the risk of the system malfunctioning will be all the lower) if the aggressiveness of the gas has been minimized, and if the presence of water within the said gas has been minimized.

The said line supplies the said system with the said gas directly. Its supplies the said gas to the inlet of the said system. The whys and wherefores of locating the system that is to be supplied with gas immediately downstream of the line will be understood from studying the considerations hereinabove about the methods of conditioning, and from the description hereinbelow of the method of the invention. In effect, the issue is obviously not one of carefully preparing a line "far" upstream of the system that is to be supplied so as to then use the said prepared line and an extension thereof or some other line, which has not been prepared, immediately upstream of the said system for supplying this system. The problems mentioned hereinabove would inevitably be encountered in the unprepared part, and this would, just as inevitably, cancel the effects of the preparation in the portion "far" upstream.

SUMMARY OF THE INVENTION

The method of the invention is thus generally performed on the entire active-gas distribution system. It may, however, obviously be performed only on part of this system, in instances where a new line or an extension of a line is or are added to a network, the upstream part of which has already been "treated" within the meaning of the invention.

The method of the invention comprises, in succession, the conventional steps of the method of the prior art, namely:

prior conditioning of the said line (conditioning as described in the introduction of the present description, on completion of which the said line is dry, clean and empty of any gas);

the actual filling of the said line with the said corrosive gas known as an active gas.

It is characterized by an original way of performing the second of the said steps. Specifically, according to the invention, the said actual filling with gas comprises:

at least one cycle of filling the said line with active gas as far as immediately upstream of the system and of removing the said active gas thus introduced into the said line; the said removal being performed without the said active gas passing through the said system;

followed by the final filling of the said line with gas so as to make the said gas available to the said system.

Thus, characteristically, according to the method of the invention, the first quantity (quantities) of active gas introduced into the said line (at least the said first quantity, referred to hereinabove as the start-up or priming quantity) is (are) removed from the said line without being delivered downstream into the system. The said system is thus spared from any contact, or any reaction with the said water-laden first quantity (quantities) of gas, which has (have) thus become more corrosive.

According to the invention, the active gas introduced during the filling with active gas of a line supplying a system is not delivered into the said system (which would be in accordance with the teachings of the prior art) but is removed upstream thereof. The intervention of the said active gas is thus optimized with respect to the passivating of the said line, while at the same time sparing the said system from the said active gas which has become wet, and therefore more aggressive, and at the same time therefore sparing the said system from the corrosion for which the said wet active gas would inevitably be responsible if it were to pass through the said system, if it were removed downstream. The said system benefits greatly from this in terms of reliability. It is thus spared from:

"direct" corrosion from the said wet active gas, any damage liable to be caused by the metal particles resulting from the degradation, by corrosion, of the interior walls of the line.

In the same way, the method performed within the said system (method which uses the active gas) is spared from any contamination from water and the said metal particles.

Characteristically, according to the method of the invention, the first quantity (quantities) of active gas delivered (contaminated by the water generated in situ) is (are) not delivered to the system that is to be supplied.

The implementation of the method of the invention and the optimization thereof is within the competence of the person skilled in the art. Obviously, it is necessary, in addition to the means necessary for filling with gas in the conventional way, to provide means (for example a pump) for removing the active gas introduced, upstream of the system. This is described in greater detail in this text.

The person skilled in the art will actually know how to manage the number of cycles of introducing and removing active gas (obviously at least one cycle) and the duration of each of these cycles so as to optimize the desired result (in terms of passivation of the line and reduction of corrosion in the said line and the system downstream).

The following specifics are non-limiting. The first cycle (only cycle or first of at least two cycles) can be performed quickly, in so as far as the oxides directly in contact with the corrosive gas react quickly: thus, the active gas may be introduced into the line in question and pumped back out of it almost immediately (in under 10 minutes, generally after 1 to a few minutes). For the next cycle or cycles, it is sensible to leave the active gas in the line for a little longer: it needs to have time to diffuse in order to generate "deep" passivation. Such "deep" passivation is generally likely to be achieved, in any event, in under 24 hours.

According to one particularly advantageous implementation of the method of the invention, the actual filling with gas (filling with active gas) comprises n successive cycles, n being a whole number greater than 1, of filling with active gas and of removing the said active gas, performed with monitoring of the water content of the said removed active gas; the final filling with gas being performed at the end of the $n^{th}$ cycle (first cycle), during which there has been no generation of water. Logically, the term "final filling with gas" is understood here to mean the filling with active gas at the end of which the active gas in question is delivered to the system downstream of the line. At the end of these n cycles, all the water likely to be generated has been generated and removed (without contact with the said system).

In any event, the performing of a single cycle within the meaning of the invention is advantageous. In general, in the context of the method according to the invention, at least two cycles are performed in succession. Advantageously, as specified hereinabove, n cycles are performed in succession, with the amount of water generated being monitored. Such monitoring may be based on various analytical methods. The method selected must obviously be compatible with the wet corrosive gas involved and advantageously allow analyses to be performed in short times. Advantageously, techniques for measuring $H_2O$ by infrared absorption spectroscopy are used.

The context of the method of the invention will now be explained in somewhat greater detail.

As mentioned earlier, the active gas in question is a corrosive gas. It may, in particular, be a gas chosen from $F_2$, $Cl_2$, $Br_2$, HF, HCl, HBr, HI, $ClF_3$ and gaseous mixtures containing at least one of these gases. In any event, this list is not exhaustive. The method of the invention is advantageously employed on a line supplying a unit for the industrial manufacture of semiconductors with one of the gases listed hereinabove, particularly with HCl, HF or HBr.

The method of the invention is also implemented for filling with gas, with passivation, any line for distributing a corrosive gas, the line being intended to distribute the said corrosive gas to a system located immediately downstream of the said line (system using the said gas or intermediate system). A distribution line such as this is liable, in particular, to connect:

a) a gas cabinet or GC (to use the term of the art) directly to a system consisting of an item of equipment that is to be supplied with the said gas, or of the equipment item using the said gas. A cabinet such as this may contain within its structure a device (valve manifold box or VMB, see next paragraph) that allows it to supply several lines in parallel;

b) a gas cabinet (or GC) to a system consisting of a valve manifold box or VMB (to use another term of the art);

c) a valve manifold box (or VMB) to a system consisting of the equipment item that is to be supplied with the said gas, as the equipment item using the said gas.

The method of the invention may thus be implemented in various contexts and, in particular, on a line of type b above then on a line of type c above, to deliver the said gas respectively from the gas cabinet (GC) to the valve manifold box (VMB) and then from the said valve manifold box (VMB) to the equipment.

Whatever the context in which it is performed, the said method optimizes the passivation of the distribution line, with the first quantities of gas delivered; these not being distributed to the system but being removed upstream of the said system, thus sparing it from corrosion. When such a method has been performed, the said distribution line is capable of delivering an ultra-pure corrosive gas, without contaminating it.

According to another of its subjects, the present invention relates to a device that can be used in implementing the method (constituting the first of the said subjects) described hereinabove. The said device is suitable for filling with gas, with passivation, a line for distributing corrosive gas or active gas, which line is intended to distribute the said corrosive gas to a system located immediately downstream of the said line. In the conventional way, it comprises:

mounted on the said line, a first shut-off valve for supplying the said line with the said gas and a second shut-off valve for supplying the said system with the said gas (the said first shut-off valve is at the inlet to the said line, whereas the second shut-off valve is at the outlet from this line);

associated with the said line, means for filling it with inert gas and for removing the said inert gas used from this line (the said means allowing the line to be purged and qualified before it is filled with active gas).

Characteristically, it further comprises:

means for purging the said line of the said active gas, introduced between the said first and second shut-off valves; the said means allowing the said purge to be performed without the said purged active gas passing through the said system.

Said means must allow the first quantities of active gas introduced (at least the first quantity of gas introduced) into the line to be removed, removal being from upstream of the system, from upstream of the second shut-off valve that isolates the said system. The said means may in particular comprise a valve mounted on the said line and connected to pumping means; the said pumping means being capable of purging the said line of the active gas introduced into it, such purging obviously being performed with the first and second shut-off valves closed. Incidentally, it will be noted that the said means for purging active gas can be used, prior to the filling with active gas, for the operation of filling the line with inert gas (for removing the said inert gas from the said line).

Advantageously, the device of the invention comprises, mounted on the line concerned, a four-way valve connected to the inert gas supply and to the purging means, which are indispensable in purging the first quantities of active gas introduced into the said line. The said four-way valve is used in two successive first positions, for the prior filling of the line with inert gas for purging and qualification purposes and, in two other successive positions, for each cycle of filling the line with active gas and of removing the said active gas. Such four-way valves thus suited to advantageous implementation of the method of the invention have, in particular, been described by the Applicant in patent application EP-A-0,814,298.

It was seen elsewhere that the method of the invention advantageously comprises n successive cycles of filling the line with active gas and removing the said active gas, performed with the water content of removed active gas being monitored. To implement this advantageous alternative form of the said method, the device specified hereinabove therefore advantageously also comprises means for measuring the water content of the purged active gas. When this water content is deemed to be acceptable, or advantageously when it is equal to the water content of the active gas entering the line, correct or even optimum passivation has been achieved. The distribution line can therefore be filled with gas for use, to deliver active gas to the system, the first and second shut-off valves being opened. The person skilled in the art is capable of selecting an effective means of measuring the said water content of the purged active gas and of incorporating the said means into the line for removing the said purged active gas.

BRIEF DESCRIPTION OF THE FIGURES OF THE DRAWING

The invention, in terms of its two aspects, method and device, will now be described with reference to the appended figures.

DETAILED DESCRIPTION OF THE PREFERRED EMBODIMENTS

Figure 1:
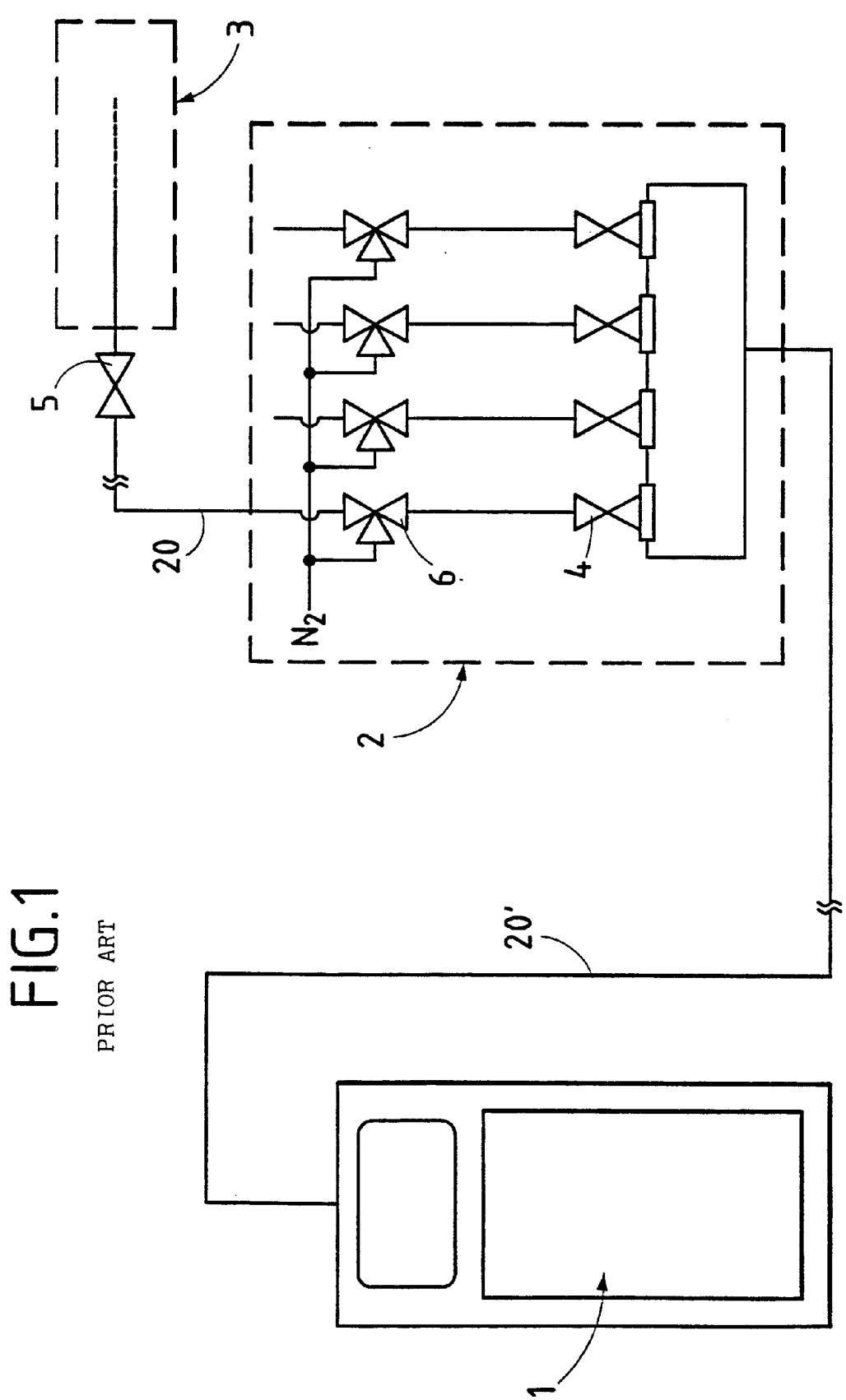
FIG. 1 diagrammatically depicts a typical installation for the distribution of corrosive gas according to the prior art.
Figure 3:
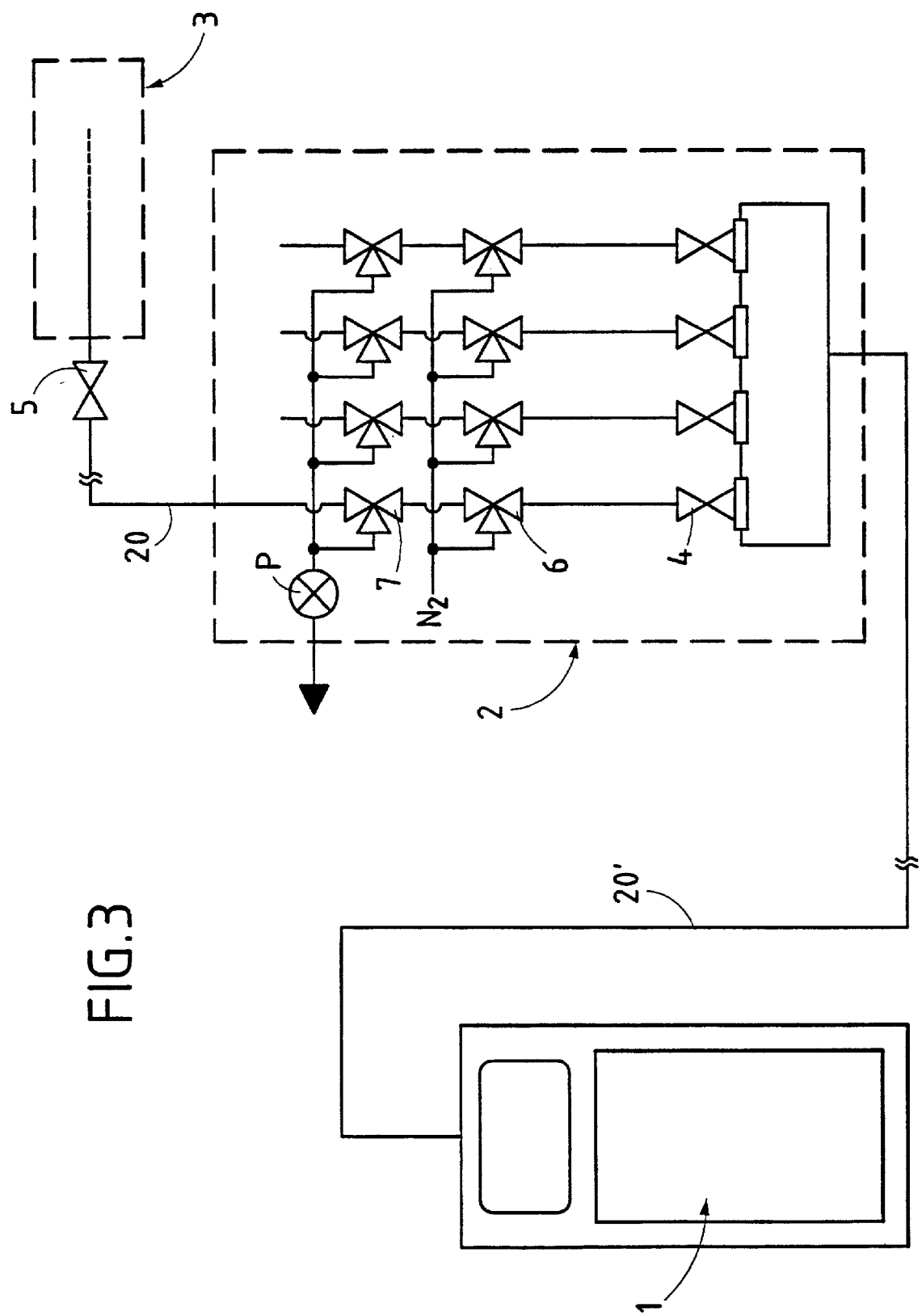
FIG. 3 diagrammatically depicts the installation of the prior art, according to FIG. 1, as modified according to a first alternative form so as to implement the method of the invention between a valve manifold box and an item of equipment.
Figure 4:
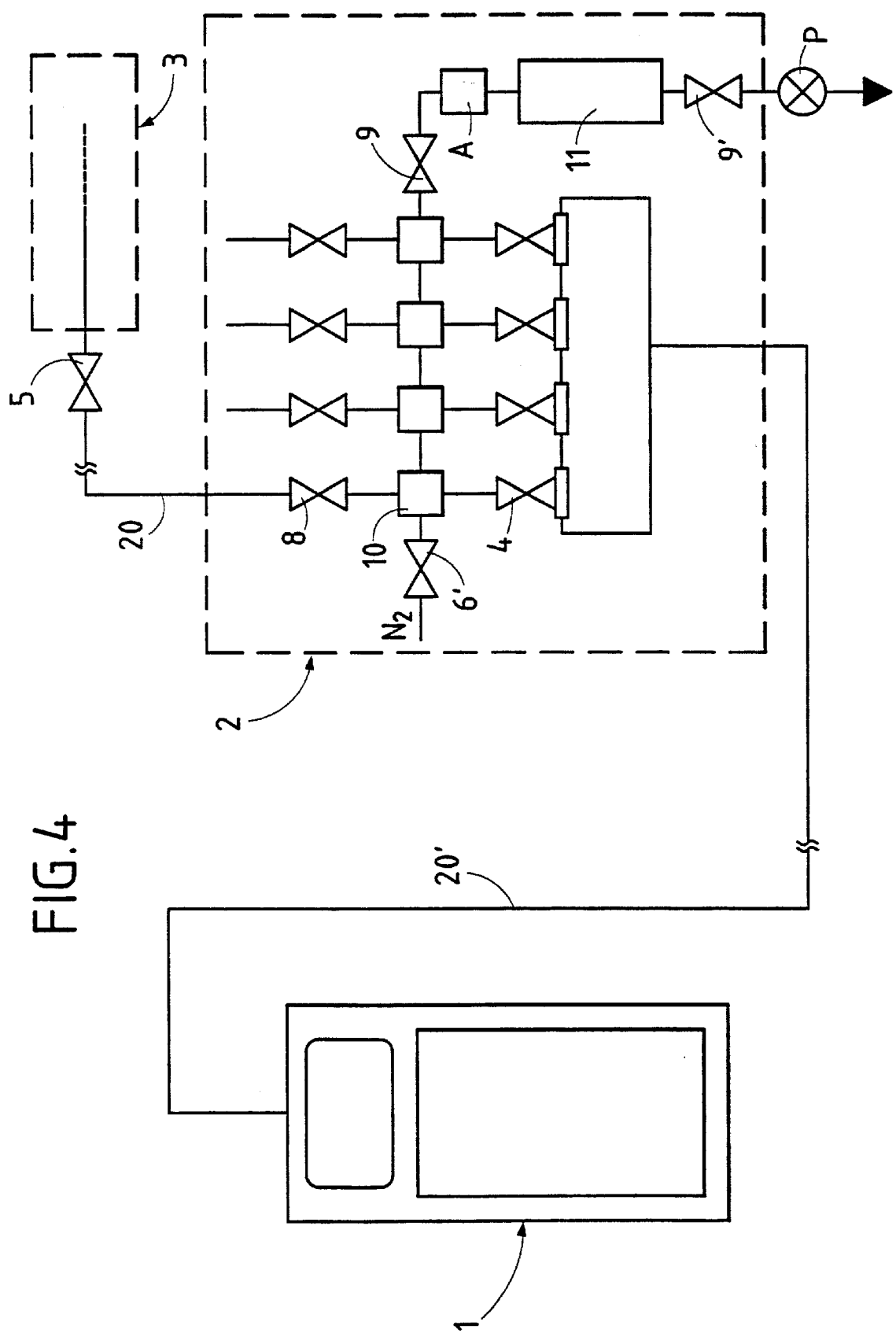
FIG. 4 diagrammatically depicts the installation of the prior art, according to FIG. 1, as modified according to another, preferred, alternative form for implementing the method of the invention, between a valve manifold box and an item of equipment.

FIGS. 1, 3 and 4 diagrammatically depict one context for the filling with gas of a distribution line 20, the said line 20 connecting a valve manifold box (VMB) 2 to any item of equipment 3.

The said valve manifold box 2 is capable of supplying four lines. It is itself supplied with the corrosive gas that is to be distributed, from the gas cabinet (GC) 1 via the line 20.

This text confines itself to discussing the prior art and describing the invention, with reference to the filling of the said line 20 with active (corrosive) gas. It now disregards the problem of filling with active gas the line 20' that connects the said gas cabinet 1 to the said valve manifold box 2. The said problem is the same and may, in the same way, be solved by implementing the invention.

According to the prior art (FIG. 1), the line 20 is conditioned beforehand. For reasons of simplification, merely the use of nitrogen has been depicted. The said nitrogen is introduced into the said line 20 via the valve 6; the shut-off valves (fully open or fully closed valves) 4 and 5 obviously being closed. During the said conditioning and on completion thereof, the said nitrogen is delivered to the system 3 via the open shut-off valve 5.

To actually fill the line 20 with gas, the shut-off valve 4 is opened, the shut-off valve 5 and the valve 6 obviously being closed.

At the end of this filling with active gas, according to the prior art, the active gas can be delivered as desired to the system 3 (from the gas cabinet 1 via the valve manifold box 2), the valves 4 and 5 being open. All of the active gas introduced into the line 20 is thus delivered to the said system 3.

The method of the prior art, described with reference to the said FIG. 1, has been implemented in particular, by the inventors, for the filling with active gas (HCl) of a gas line (made of stainless steel) 4 m long with an inside diameter of 4 mm. The said line had been perfectly dried beforehand using nitrogen.

Figure 2:
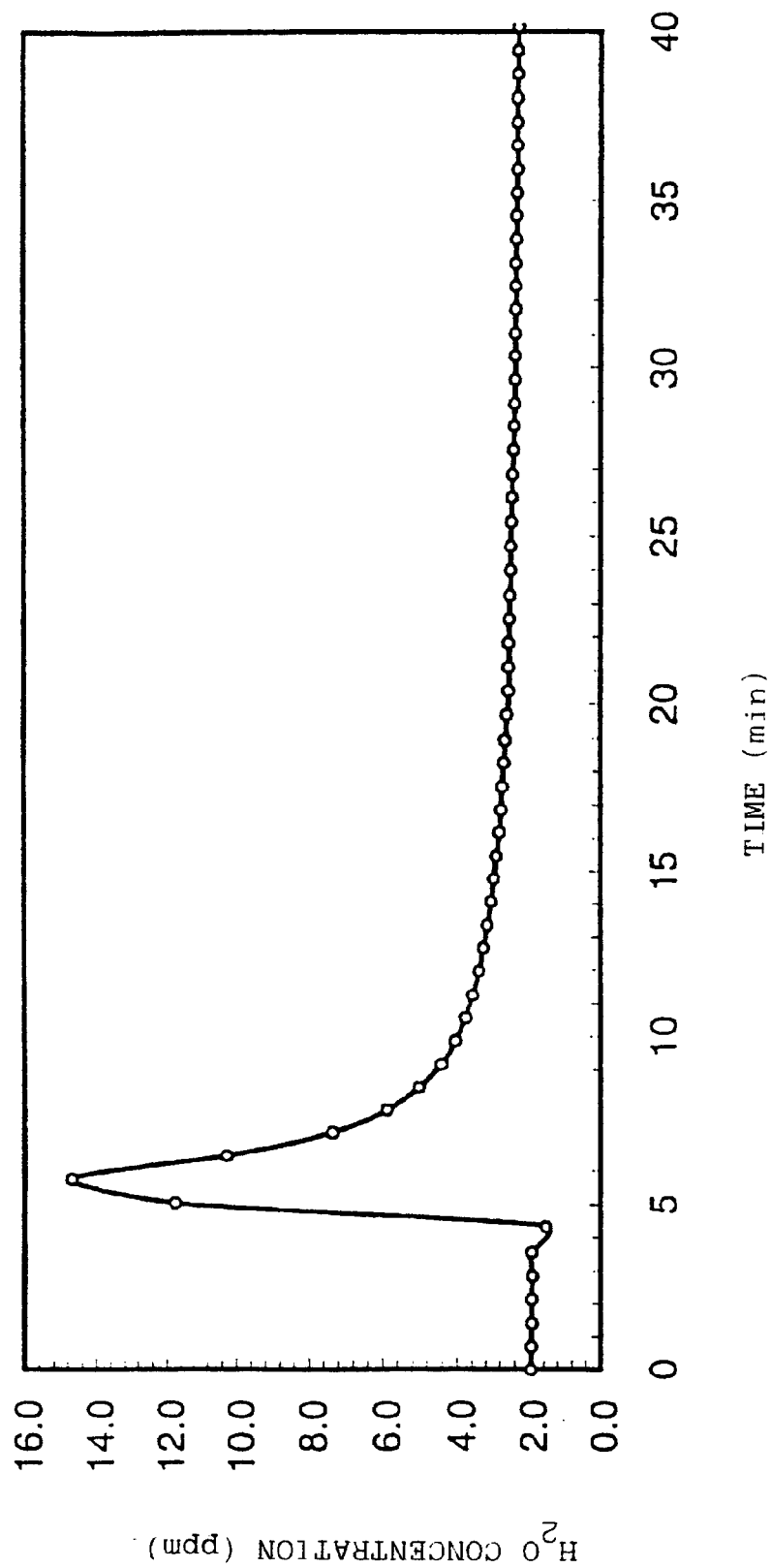
FIG. 2 illustrates the phenomenon clearly identified by the Applicant, responsible for the problems of the prior art: that of the in-situ generation of water when a metal line is filled with active gas (generation at t=4 min).

The inventors monitored the water content of the active gas delivered by the said line and clearly demonstrated, in FIG. 2, the generation of water in a perfectly dry pipe through which a stream of HCl flowed.

According to the prior art, the said water is delivered to the system 3. According to the invention, it is removed without contacting the said system 3.

According to the first alternative form of the invention, illustrated in FIG. 3, the line 20 comprises the means necessary for filling it with inert gas beforehand and supplying it with active gas: the valves 6 (for supplying nitrogen), the shut-off valve 4 (for the supply of active gas), the shut-off valve 5 (for opening and closing the said line 20). Characteristically, there is also a valve 7 associated with appropriate means (particularly a pumping system P); the said valve 7 (known as the pumping valve) and the said means allowing the said line 20 to be purged (without delivering into the system 3, the valve 5 being closed). To fill the said line 20 with insert gas beforehand, the procedure is as described hereinabove with reference to FIG. 1. The inert gas may finally be removed via the valve 5 into the system 3 or via the pumping valve 7. To actually fill with gas, the following cycle:

of filling the said line 20 with active gas, the valve 4 being open and the valve 5 being closed;
of removing the said active gas via the valve 7, the valves 4 and 5 being closed, is performed at least once.

At the end of a single cycle of several cycles of this type, the said line 20 is finally filled with active gas, it being possible for the said active gas then to be delivered via the valve 5 to the system 3.

According to the second alternative form of the invention, illustrated in FIG. 4, the line 20 comprises:

a first shut-off valve 4 for supplying the said line 20 with active gas;
a second shut-off valve 5 for supplying the system 3.

The valve 6' mounted on the nitrogen supply line is used for filling with inert gas beforehand.

Characteristically, to implement this preferred alternative form of the method of the invention, there is also a four-way valve 10 and other on-or-off valves 8, 9 and 9' and an absorption column 11. For the conditioning operations, the valves 6', 8 and 10 are open, while the valves 4, 5 and 9 are closed. At the end of the said operations, the nitrogen is removed to the system 3, the valve 5 being open and the valve 6' being closed.

To actually fill with gas, the said valve 5 is closed and the valve 4 is opened, the valve 8 remaining open, and the valve 10 allowing communication between the valve 4 and the valve 8. The line 20 is thus filled with active gas which, in passivating it, becomes laden with water. The said line 20 then needs to be emptied of the active gas thus contaminated with the said water. For this purpose, the valve 4 is closed again, and the valves 9 and 9' are opened and the valve 10 is in a position such that it allows the valves 4 and 9 and the valves 8 and 9 to communicate. The active gas pumped, by a pumping system P located downstream of the valve 9', is neutralized on the absorption column 11. It is thus incapable of damaging the said pumping system P.

An analyzer A for measuring the hygrometry of the said gas has been provided upstream of the said column 11.

A number of successive gas-filling cycles (cycles of filling and draining via the column 11) can thus be performed, with monitoring of the hygrometry of the drained active gas. When the water content of the said drained gas is equal to the water content of the gas introduced, it is possible to be sure of total effective passivation of the line 20. The line can then be filled one last time, discontinuously, to then deliver the active gas to the system 3.

What is claimed is:

1. Method for filling with gas, with passivation, a line for distributing a corrosive or active gas, which line is suitable for distributing said gas to a system located immediately downstream of said line; said method comprising:

prior conditioning of said line; and
   actual filling of said line with said gas;
   wherein said actual filling with said gas comprises:
   at least one cycle of filling said line with said gas and of removing said gas thus introduced into said line; said removal being performed without said gas passing through said system, wherein the first quantity of said gas introduced into said line is removed without passing through said system;
   followed by a final filling of said line with said gas so as to make said gas available to said system.

2. Method according to claim 1, wherein said gas is selected from the group consisting of $F_2$, $Cl_2$, $Br_2$, HF, HCl, HBr, HI, $ClF_3$ and gaseous mixtures containing at least one of these gases.

3. Method according to claim 2, wherein it is employed for filling with said gas said distribution line connecting a gas cabinet to said system comprising a valve manifold box and/or for filling with said gas said distribution line connecting a valve manifold box to said system which consists of an item of equipment to be supplied with said gas.

4. Method according to claim 1, wherein it is employed for filling with said gas said distribution line connecting a gas cabinet to said system which comprises an item of equipment to be supplied with said gas.

5. Method according to claim 1, wherein it is employed for filling with said gas said distribution line connecting a gas cabinet to said system comprising a valve manifold box and/or for filling with said gas said distribution line connecting a valve manifold box to said system which comprises an item of equipment to be supplied with said gas.

6. Method according to claim 1, wherein during the at least one cycle, the line is filled with the active gas to immediately upstream of the system.

7. Method according to claim 1, wherein the prior conditioning of the line comprises purging the line with an inert gas.

8. Method for filling with gas, with passivation, a line for distributing a corrosive or active gas, which line is suitable for distributing said gas to a system located immediately downstream of said line; said method comprising:

prior conditioning of said line; and
   actual filling of said line with said gas;
   wherein said actual filling with said gas comprises:
   at least one cycle of filling said line with said gas and of removing said gas thus introduced into said line; said removal being performed without said gas passing through said system;
   followed by a final filling of said line with said gas so as to make said gas available to said system, wherein said actual filling with said gas comprises n successive cycles, n being a whole number greater than 1, of filling with said gas and of removing said gas, performed with monitoring of the water content of said removed gas; the final filling with said gas being performed at the end of the $n^{th}$ cycle, during which there has been no generation of water.

9. Method according to claim 2, wherein said gas is selected from the group consisting of $F_2$, $Cl_2$, $Br_2$, HF, HCl, HBr, HI, $ClF_3$ and gaseous mixtures containing at least one of these gases.

10. Method according to claim 2, wherein it is employed for filling with said gas said distribution line connecting a gas cabinet to said system which comprises an item of equipment to be supplied with said gas.

11. Method according to claim 8, wherein it is employed for filling with said gas said distribution line connecting a gas cabinet to said system comprising a valve manifold box and/or for filling with said gas said distribution line connecting a valve manifold box to said system which comprises an item of equipment to be supplied with said gas.

12. Device suitable for filling with gas, with passivation, a line for the distribution of corrosive gas or active gas, said line being suitable for distributing said gas to a system located immediately downstream of said line; said device comprising:

mounted on said line, a first shut-off valve for supplying said line with said gas and a second shut-off valve for supplying said system with said gas;

associated with said line, means for filling it with inert gas and for removing said inert gas used from said line;

wherein said device further comprises:

means for purging said line of said active gas, introduced between said first and second shut-off valves; said means allowing said purge to be performed without said purged gas passing through said system; and means for measuring the water content of the purged gas.

13. Device according to claim 12, wherein it comprises a four-way valve mounted on said line and connected to the inert gas supply and to the purge means.

14. Device according to claim 7, wherein said means for measuring the water content of the purged gas comprises an analyzer.

15. Method for filling a gas distribution line with a corrosive or active gas, comprising introducing a gas stream comprising said corrosive or active gas to the device according to claim 12.

16. Method for filling with gas, with passivation, a line for distributing a corrosive or active gas, which line is suitable for distributing said gas to a system located immediately downstream of said line; said method comprising:

prior conditioning of said line; and actual filling of said line with said gas;

wherein said actual filling with said gas comprises:

at least one cycle of filling said line with said gas and of removing said gas thus introduced into said line; said removal being performed without said gas passing through said system, wherein the first quantity of said gas introduced into said line is removed without passing through said system;

followed by a final filling of said line with said gas so as to make said gas available to said system, wherein said gas is selected from the group consisting of $F_2$, $Cl_2$, $Br_2$, HF, HCl, HBr, HI, $ClF_3$ and gaseous mixtures containing at least one of these gases, and wherein it is employed for filling with said gas said distribution line connecting a gas cabinet to said system which comprises an item of equipment to be supplied with said gas.

17. Method according to claim 16, wherein the prior conditioning of the line comprises purging the line with an inert gas.

* * * * *